Nov. 22, 1938.   A. E. DIXON   2,137,835
FINGER RING
Filed Sept. 9, 1937
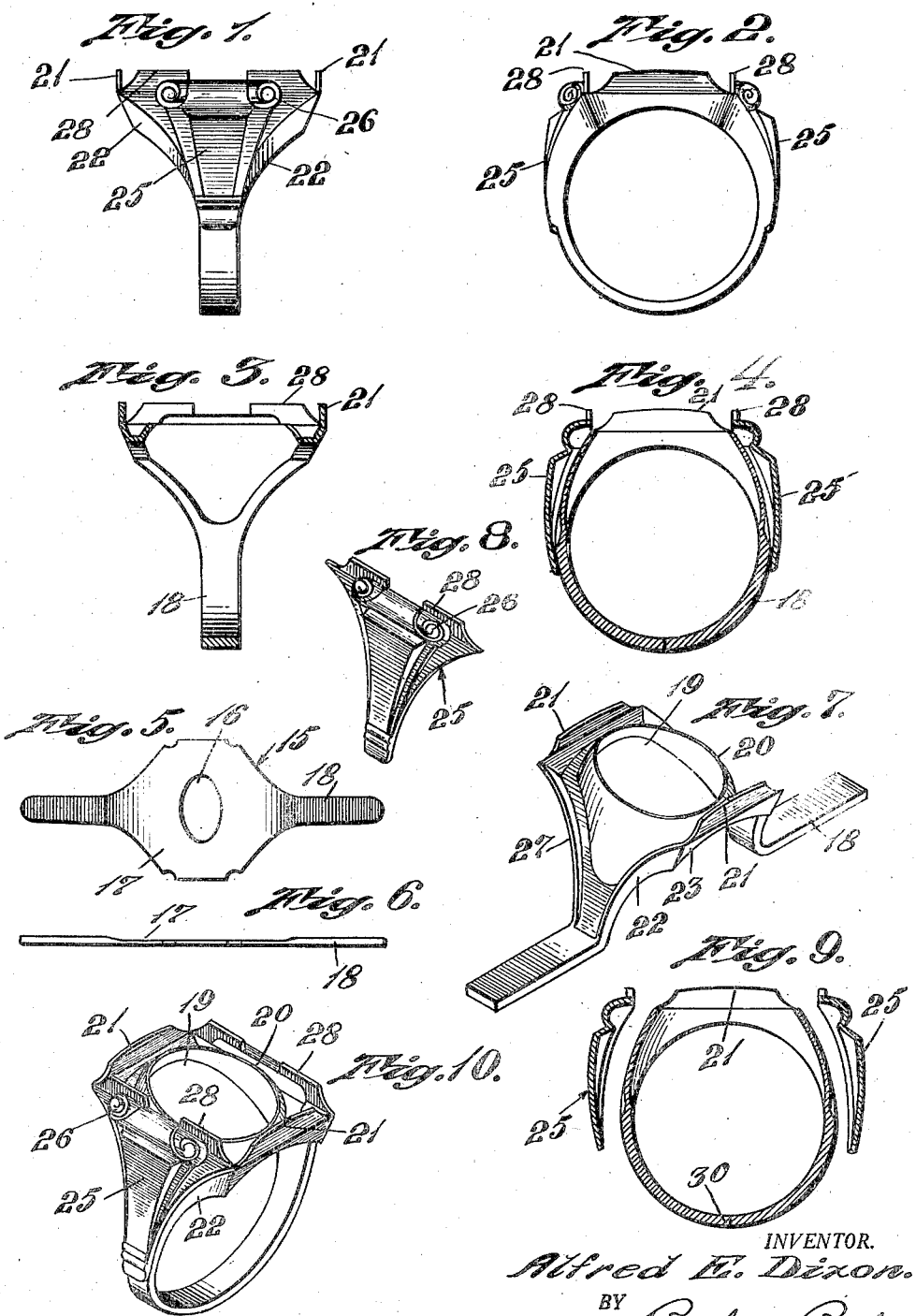
INVENTOR.
Alfred E. Dixon.
BY Barlow & Barlow
ATTORNEYS.

Patented Nov. 22, 1938

2,137,835

UNITED STATES PATENT OFFICE 2,137,835

FINGER RING

Alfred Eddy Dixon, Providence, R. I., assignor to Ostby and Barton Company, a corporation of Rhode Island Application September 9, 1937, Serial No. 162,965

4 Claims. (Cl. 63—15)

This invention relates to a finger ring; and has for one of its objects the formation of a ring for the reception of a gem from a fewer number of individual parts than exists in the usual construction of similar rings in common use at the present time.

Another object of the invention is to provide integral projections about the setting for the gem which may be bent over the gem to secure it in place and thus eliminate the necessity of soldering such securing projections in place and minimizing the labor necessary in connection with the making of such a ring and thus reducing the cost of the same.

Another object of the invention is to make a more secure ring by forming parts from the same piece of material and thus eliminating certain soldering operations.

Another object of the invention is to make a massive appearing ring which is of hollow construction and thus one which may be made in the precious metals without the weight of the material heretofore used for the formation of the massive appearing structure and thus one which will not be of excessive cost.

With these and other objects in view, the invention consists of certain novel features of construction, as will be more fully described, and particularly pointed out in the appended claims.

In the accompanying drawing:

Fig. 1 is an edge elevation of the ring;

Fig. 2 is a side elevation;

Fig. 3 is a central sectional view;

Fig. 4 is a central sectional view at right angles to the section of Fig. 3;

Fig. 5 is a plan view of the blank before the ring is drawn up into shape;

Fig. 6 is an edge view of the blank shown in Fig. 5;

Fig. 7 is a perspective view of the shank and top of the ring after the drawing operation;

Fig. 8 is a perspective view of a trimming which is applied to the shank in Fig. 6;

Fig. 9 is a sectional view showing the shank and top with the trimmings in spaced relation, but in a position analogous to that in which they will be secured when the ring is finished;

Fig. 10 is a perspective view of the shank and trimming complete and ready for the setting of the gem.

In the formation of finger rings of this character which are to receive and carry a gem, it is usual that the portions which extend over the gem be separate and soldered onto the top of the ring, and thus a ring so formed is of several parts which requires the handling of each of these parts and the soldering of them together to form a unit; and in order that the ring may be simplified I have formed the shank and top all in one piece together with integral projections which are to be bent over the stone from the same piece, and I have secured the trimmings to the shank and caused these trimmings to also carry projections to bend over the stone and thus provided a three-part structure requiring but a minimum of two soldering operations to provide a unit assembly; and the following is a more detailed description of the present embodiment of this invention, illustrating the preferred means by which these advantageous results may be accomplished:

With reference to the drawing, 15 designates a blank of sheet stock which at the time of cutting out is provided with a hole 16. The larger portion 17 of this blank is thinned as shown in Fig. 6 leaving the shank portions 18 of a thicker stock. This may be accomplished by a pressure or striking operation.

This blank 15 is then drawn by striking so as to shape the same, as illustrated in Fig. 7, which provides an enlarged opening 19 the edge 20 of which forms a seat for the gem, while the edges of this enlarged portion 17 are drawn up to provide fingers 21 which may be bent over a gem when it is placed upon its seat 20. The shanks 18 remain substantially in their original condition of shape while there is a lip or wall 22 turned upwardly and connecting the wall portions 23 and the shank, as illustrated in Fig. 7.

Trimmings 25 which are at first of sheet stock of a thickness similar to the thickness of the portion 17 of the blank are struck in a dye to provide an ornamental shape in relief, as illustrated at 26 in Fig. 8, and are of a shape to fit upon the edges 27 of the lips or walls 22 with their fingers 28 extending above the edges of the lips 22 and walls 23 as may be seen in Figs. 1, 9 or 10, so that these fingers 21 and 28 may be bent over the opposite edges of the gem to hold the same snugly against the seat 20.

The shanks 18 of the structure thus formed are brought together as at the joint 30 and soldered to provide the desired finger size of ring which will fit the customer. By this arrangement the ring is provided of but three parts and yet a seat is formed and the integral fingers so located as to be easily bent over the gem to provide a strong structure and yet one not requiring many assembling operations.

The hollow structure between the trimmings and the shank gives the ring a massive appearance and yet the same is light and comfortable on the hand and is formed of a minimum amount of stock which is of importance where precious metals are used.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a finger ring, a top portion with an integral shank extending therefrom shaped to complete the finger encircling portion, said top portion being enlarged to form a relatively wide member with a central opening therein and a wall surrounding the opening integral with the top and extending outwardly therefrom to provide a seat for a gem, projections integral with said enlarged top portion at the edges thereof to provide fingers disposed at opposite sides of said opening in spaced relation to said wall, the tips of said fingers being adapted to be bent over the edges of a gem upon its top faces to hold the gem in place in its setting when seated upon said wall, and means to prevent edgewise displacement of the gem.

2. In a finger ring, a top portion with an integral shank extending therefrom shaped to complete the finger encircling portion, said top portion being enlarged to form a relatively wide member with a central opening therein and a wall surrounding the opening integral with the top and extending outwardly therefrom in which the forward edges of the wall provide a seat for a gem, the sides of said wall being convex and curved inwardly, projections integral with said enlarged top portion at the edges thereof to provide fingers disposed at opposite sides of said opening in spaced relation to said wall, the tips of said fingers being adapted to be bent over the edges of a gem upon its top faces to hold the gem in place in its setting when seated upon said wall, and means to prevent edgewise displacement of the gem.

3. In a finger ring, a top portion with an integral shank extending therefrom shaped to provide the main annular finger encircling portion, said top portion being enlarged to form a relatively wide base member with a central opening therein having a marginal wall integral with said base member and dished outwardly therefrom to provide an upstanding continuous wall surrounding the opening, the side faces of said wall being convex and curved inwardly with the forward edge portions thereof providing a seat for a gem, projections integral with said enlarged top portion at the edges thereof to provide fingers disposed at opposite sides of said opening in spaced relation to said wall, the tips of said fingers being adapted to be bent over the edges of a gem to engage its top faces for holding the gem in place in its setting when seated upon said wall, and individual side trimmings at the sides of said completed ring extending substantially semi-circumferentially thereof and attached to said shanks below the center of the ring, said trimmings being spaced from said top and the shanks to provide a hollow structure, and projections at the upper end of said trimmings integral therewith to extend over an edge of the gem to engage the same.

4. In a finger ring, a top portion with an integral shank extending therefrom shaped to complete the finger encircling portion, said top portion being enlarged to form a relatively wide member and so constructed and arranged so as to provide a seat for a gem, projections formed of the same piece of stock with said enlarged top portion at marginal portions thereof to provide spaced fingers disposed at opposite sides of said seat, the tips of said fingers being adapted to be bent over the edges of a gem upon its top faces to hold the gem in place in its seat on said top portion, and means to prevent edgewise displacement of the gem.

ALFRED EDDY DIXON.